Figure 1:
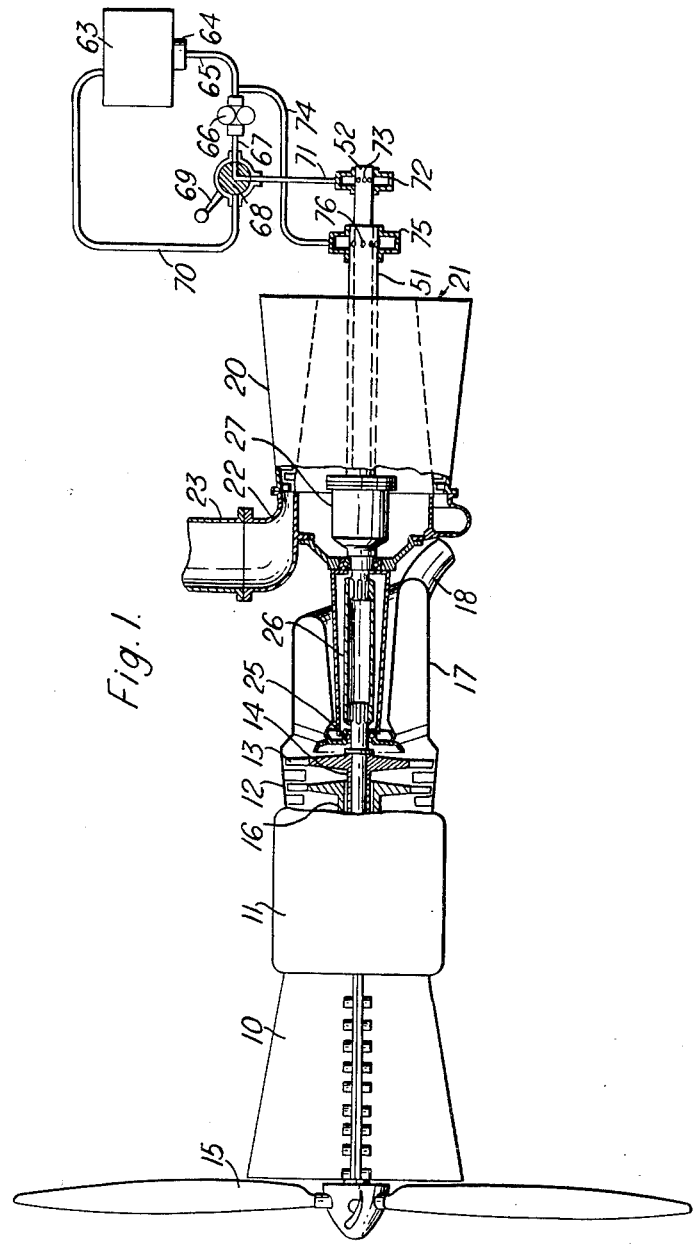

July 3, 1962

J. A. PETRIE ETAL 3,042,167

FRICTION CLUTCHES

Filed Jan. 5, 1960

2 Sheets-Sheet 1

Inventors
JAMES ALEXANDER PETRIE
KENNETH EDWARD GEORGE BRACEY

By Cushman, Darby & Cushman
Attorneys

July 3, 1962

J. A. PETRIE ETAL 3,042,167

FRICTION CLUTCHES

Filed Jan. 5, 1960

2 Sheets-Sheet 2

Inventors
JAMES ALEXANDER PETRIE
KENNETH EDWARD GEORGE BRACEY
By
Cushman, Darby & Cushman
Attorneys United States Patent Office 3,042,167
Patented July 3, 1962

3,042,167
FRICTION CLUTCHES
James Alexander Petrie, Littleover, Derby, and Kenneth Edward George Bracey, Findern, England, assignors to Rolls-Royce Limited, Derby, England, a company of Great Britain
Filed Jan. 5, 1960, Ser. No. 627
Claims priority, application Great Britain Feb. 23, 1959
5 Claims. (Cl. 192—86)

This invention relates to an improved friction clutch.

According to the invention there is provided a friction clutch comprising an input and an output drive member each of which carries one or more friction drive elements which are adapted to be moved into and out of engagement with each other, and a fluid operated piston and cylinder device for urging said friction drive elements into driving contact with each other, at least a part of said piston and cylinder device being connected to one of said drive members so as to be rotatable therewith, whereby such rotation causes the pressure of the operating fluid in the cylinder to rise as a result of centrifugal force, the piston and cylinder device being so formed or means being provided such that the effects of such pressure rises are balanced across the piston.

Preferably the piston of the said piston and cylinder device is a double acting piston opposite faces of which are respectively subjected to relatively high and low pressures, both said faces being of equal effective area so that forces due to centrifugal action on the fluid are balanced across the piston.

The clutch may comprise a rotatably mounted cylindrical outer casing constituting the input drive member of the clutch, a shaft being mounted concentrically within the outer casing and carrying said piston and cylinder device, said shaft constituting the output drive member of the clutch.

Preferably one end of the cylinder is permanently connected to means for supplying low pressure operating fluid, the other end of the cylinder being alternately connectible (so as to effect engagement and disengagement of the friction drive elements) either to means for supplying high pressure operating fluid or to drain.

The input drive member may be driven by a gas-turbine engine, the output drive member being constituted by the rotor shaft of an auxiliary compressor.

The said gas-turbine engine may be provided on a rotary wing aircraft having a propeller driven by a low pressure turbine of said engine, the input drive member also being driven by said low pressure turbine of said engine and compressed air from the auxiliary compressor being used in the production of a motive fluid employed for driving a rotor of said aircraft.

Figure 2:
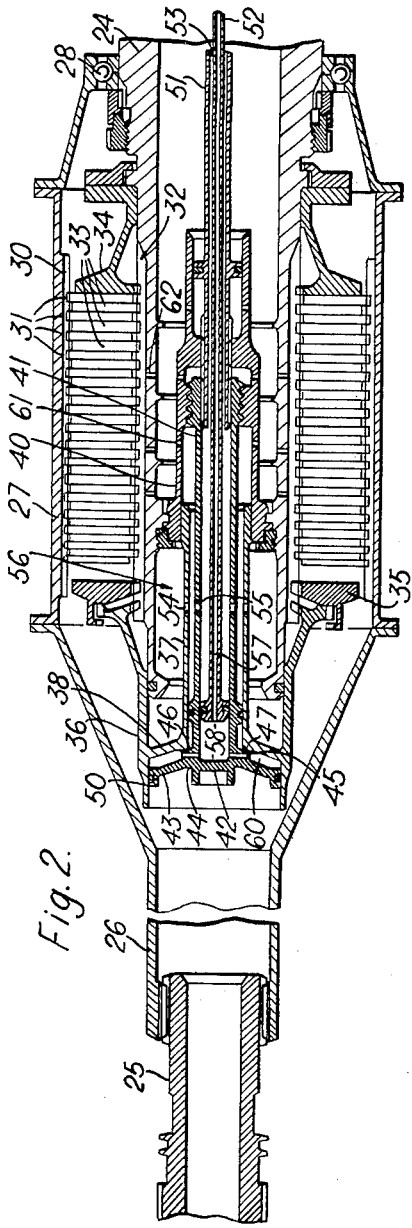
Figure 3:
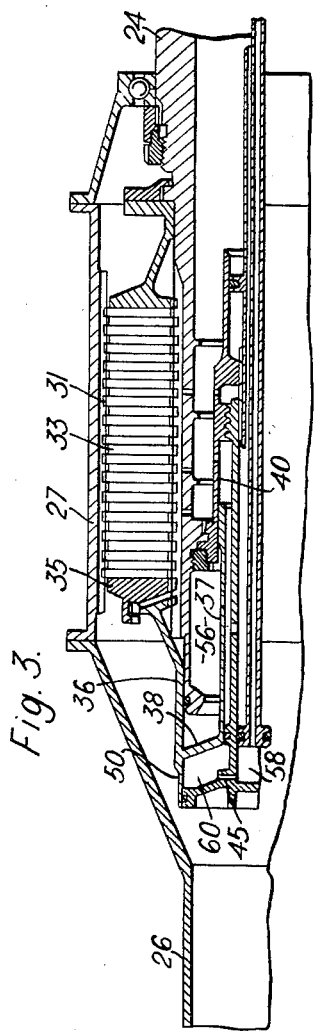

The invention is illustrated, merely by way of example, in the accompanying drawings, in which:

FIGURE 1 is a schematic view, partly in section, of a gas-turbine engine for a rotary wing aircraft, said engine incorporating a friction clutch according to the present invention, FIGURE 2 is an axial section through said clutch to a larger scale, and FIGURE 3 is a broken-away section corresponding to the upper portion of FIGURE 2 but showing the parts of the clutch in different positions.

Referring to the drawings, a rotary wing aircraft comprises a centrally disposed aircraft rotor (not shown) for effecting vertical ascent and descent of the aircraft and two turbo-propeller engines, arranged on opposite sides of the aircraft fuselage, for effecting forward thrust. One of these turbo-propeller engines is illustrated in FIGURE 1.

As seen in FIGURE 1, each turbo-propeller engine comprises high and low pressure compressors 10, combustion equipment 11, and high and low pressure turbines 12, 13 respectively. The low pressure compressor and the low pressure turbine 13 are mounted on a shaft 14 which drives a propeller 15 through reduction gearing (not shown), the shaft 14 being mounted concentrically within a shaft 16 on which are mounted the high pressure compressor and the high pressure turbine 12. The exhaust gases from the turbines 12, 13 pass into an axially elongated annular manifold 17 and are discharged therefrom by way of an exhaust duct 18.

Each turbo-prop engine includes an auxiliary axial flow compressor 20 having an air intake 21, the air compressed by the compressor 20 passing by way of a volute 22 to a duct 23. The compressed air from the ducts 23 of the two compressors 20 passes to the main rotor of the aircraft where it is employed in the production of the motive fluid used to drive the rotor.

The rotor shaft 24 (FIGURE 2) of each of the compressors 20 is driven from the low pressure shaft 14 by way of a shaft 25 which is mounted within and has a splined connection with a shaft 26.

The shaft 26 constitutes an axial extension of a cylindrical clutch casing 27. The clutch casing 27 forms the input drive member of the clutch, while the auxiliary compressor rotor shaft 24, which is journalled in bearings 28 carried by the casing 27, forms the output drive member of the clutch.

The casing 27 is provided with internal, axially-extending, splines 30 on which are mounted a plurality of annular clutch plates 31 through whose central openings extends the shaft 24. The latter is provided with external, axially-extending splines 32 in which are mounted annular clutch plates 33 which are arranged alternately of the plates 31.

The plates 31, 33 are disposed between a fixed thrust plate 34, which is secured to the shaft 24, and a movable thrust plate 35 which is splined onto the shaft 24.

The thrust plate 35 is movable, by means hereinafter described, between the disengaged position shown in FIGURE 2, in which it is spaced from the clutch plates 31, 33 and in which the drive imparted to the casing 27 by the high pressure turbine 12 is therefore not transmitted to the shaft 24, and the engaged position shown in FIGURE 3 in which it forces the plates 31, 33 firmly into contact whereby to effect transmission of the said drive.

The movable thrust plate 35 is mounted at the right hand end (as seen in FIGURES 2 and 3) of an outer skirt portion 36 of an axially movable sleeve 37. The skirt 36 is arranged concentrically about the sleeve 37 to which it is connected by an annular web 38 which, as will hereinafter appear, constitutes a piston.

Mounted concentrically within and secured to the shaft 24 is a sleeve 40 into which is screwed a sleeve 41 which is mounted concentrically of the sleeve 40. The sleeve 41 has a closed end 42 (which, as seen in FIGURES 2 and 3, is the left hand end thereof).

The sleeve 41 is provided, adjacent its end 42, with a flange 43 having a thickened root portion 44. The portion 44 has drillings 45 therethrough and an abutment surface 46 adapted to be engaged by an abutment surface 47 on the sleeve 37.

The skirt 36 has an axially extending portion 50 within which the flange 43 is slidably mounted.

Mounted within the sleeve 40 is a tube 51 within which is concentrically mounted a tube 52. An annular clearance 53 is provided between the tubes 51, 52 and is open to a supply of low pressure oil by means hereinafter described. The sleeves 37, 41 are respectively provided with a series of ports 54, 55 through which the low pressure oil may flow to an annular chamber 56 whose walls are defined by the sleeve 37, piston 38, skirt 36, shaft 24, and sleeve 40.

The left hand end 57 (as seen in FIGURES 2 and 3) of the tube 52 is mounted within and sealed against the sleeve 41. The end 57 is spaced from the end 42 so as to provide a reservoir chamber 58 which is adapted to be supplied, by means hereinafter described, with high pressure oil via the interior of the tube 52. High pressure oil may flow from the reservoir chamber 58 and via the drillings 45 into an annular chamber 60 provided between the flange 43 and piston 38.

The sleeve 40 is provided with radial drillings 61 which communicate with the interior of the shaft 24. The latter is provided with a number of radial drillings 62 therethrough which communicate with the troughs of the splines 32. Low pressure oil from the clearance 53 may therefore pass to the interior of the shaft 24 via the ports 55 and drillings 61. On rotation of the shaft 24, this low pressure oil will be centrifuged through the drillings 62 so as to effect a wetting of the clutch plates 31, 33. The oil is so fed to the clutch plates in order to ensure an appropriate coefficient of the friction when the plates are urged together.

The low and high pressure oil supply comprises a tank 63 (see FIGURE 1). Oil from the tank 63 is pumped by a booster or backing pump 64 into a line 65 which is connected to the inlet side of a high pressure pump 66. The discharge from the pump 66 is delivered to a line 67. Line 71 is alternately connectable by a two-position valve 68 either to line 67 as shown in FIGURE 1 or to a return line 70, which discharges into the tank 63. Means, diagrammatically represented as a manually operable lever 69, are provided to effect movement of the valve 68 between the two positions.

The line 71 communicates with a muff 72 within which is journalled an end of the tube 52. Radial drillings 73 through the tube 52 permit oil delivered through the line 71 to pass to the interior of the tube 52.

A line 74 communicates with the line 65 on the inlet side of the pump 66 so that oil from the line 65 passing into the line 74 by-passes the pump 66. The line 74 communicates with a muff 75 within which is journalled an end of the tube 51. Radial drillings 76 through the tube 51 permit oil delivered through the line 74, to pass to the clearance 53 between the tubes 51, 52.

The oil in the clearance 53 is thus pressurised by the backing pump 64 only and is therefore low pressure oil (e.g. at a pressure of 50 pounds per square inch) whereas the oil in the tube 52 is pressurised by both the pumps 64, 66 and is therefore high pressure oil (e.g. at a pressure of over 400 pounds per square inch).

It will be appreciated that throughout the operation of each turbo-propeller engine, the oil in the chamber 56 will be maintained by the pump 64 at the said low pressure, whereas the oil in the chamber 60 will be at the said high pressure only when the two-position valve 68 is set, as shown in FIGURE 1, in the position in which communication is established between the lines 67, 71.

In operation, when it is desired to engage the clutch, the two-position valve 68 is set to the position shown in FIGURE 1. The chambers 56, 60 will thus be respectively supplied with low and high pressure oil. The opposite faces of the piston 38 are arranged to be of substantially the same effective area. The piston 38, which as will be seen effectively forms a part of a piston and cylinder device, will therefore be forced towards the right (as seen in FIGURES 2 and 3) so as to cause corresponding movement of the thrust plate 35 and hence engagement of the clutch plates 31, 33. The casing 27 will at this time, be rotated by the low pressure turbine 13. The engagement of the plates 31, 33 will thus cause the drive from the turbine 13 to be transmitted to the shaft 24 so as to drive the auxiliary compressor 20.

Rotation of the shaft 24 will cause the low pressure oil in the chamber 56 to be subjected to centrifugal force. The high pressure oil in the chamber 60 will be similarly subjected to centrifugal force but it will be appreciated that if the faces of the piston 38 open to the low and high pressure oil respectively were of different effective area, the effect of centrifugal force could be to alter the differential between the pressures in the chambers 56, 60 to such an extent that the piston 38 would be moved so as to effect disengagement of the clutch. Since, however, the opposite faces of the piston 38 are of substantially the same effective area, the effect of centrifugal force is balanced across the piston.

When it is desired to disengage the clutch, the valve 68 is moved by the lever 69 to the position in which the line 71 is brought into communication with the line 70. The pressure in the chamber 60 will therefore immediately fall to a pressure lower than that in chamber 56 and the piston 38 will move so as to disengage the thrust plate 35 from the clutch plates.

At take-off, the turbo-propeller engines are started and their clutches are engaged, the propellers 15 of the engines then being in the zero pitch position. The engagement of the clutch causes the drive from the low pressure turbines to be transmitted to the auxiliary compressor 20, whereby compressed air is fed to the aircraft rotor where fuel is burnt with it, the products of combustion being employed to cause rotation of the rotor. As a result of such rotation the aircraft ascends, the pitch of the propellers 15 being differentially or collectively controlled to prevent yawing or pitching of the aircraft. When the aircraft has gained sufficient height, the pitch of the propellers 15 is gradually increased until, when the aircraft has gathered sufficient forward speed, the clutches are disengaged.

The reverse procedure is, of course, followed when it is required to land the aircraft.

We claim:

1. A friction clutch comprising: an input drive member and an output drive member; at least one friction drive element carried by each of said drive members, said friction drive elements being adapted to be moved into and out of engagement with each other; a double acting fluid operated piston, said piston comprising an inner piston plate having an outer cylindrical wall portion; a radially outwardly projecting member for urging said friction drive elements into driving contact with each other; a hollow inner sleeve; said piston plate and said outwardly projecting member and said hollow inner sleeve being fixedly connected together, said piston plate having opposite faces of equal effective area, one of said drive members being sealed against said cylindrical wall portion and said hollow inner sleeve and defining with said piston a first fluid chamber on one side of said piston plate; a hollow shaft connected to said one drive member and extending inwardly of said sleeve and coaxially through said piston plate, said shaft being sealed against said sleeve; a sealing member carried by said shaft and sealed against said cylindrical wall portion, said shaft and sealing member defining with said piston a second fluid chamber on the opposite side of said piston plate from said first fluid chamber, said piston being axially movable relative to said one drive member, said shaft and said sealing member; and means defining passageways for supplying fluid to said fluid chambers whereby on selectively varying of fluid pressure in at least one of said fluid chambers, the piston is moved axially so as to actuate the clutch.

2. A friction clutch comprising: an input drive member and an output drive member; at least one friction drive element carried by each of said drive members, said friction drive elements being adapted to be moved into and out of engagement with each other; a double acting fluid operated piston, said piston comprising an inner piston plate having a hollow outer cylindrical wall portion, a radially outwardly projecting member for urging said elements into driving contact with each other, and a hollow inner sleeve, said piston plate and said outwardly projecting member and said sleeve being fixedly connected together, said piston plate having opposite faces of equal effective area, one of said drive members being sealed against the internal surface of said cylindrical wall portion and said sleeve defining with said piston a first fluid chamber; a hollow shaft connected to said one drive member and extending inwardly of said sleeve and coaxially through said piston plate, said hollow shaft being sealed against said sleeve; a sealing member carried by said shaft and sealed against said cylindrical wall portion, said shaft and sealing member defining with said piston a second fluid chamber on the opposite side of said piston plate from said first fluid chamber, said piston being axially movable relative to said one drive member, said shaft and said sealing member; and means defining passageways for supplying fluid to said fluid chambers whereby on selectively varying of fluid pressure in at least one of said fluid chambers, the piston is moved axially so as to actuate the clutch.

3. A friction clutch as claimed in claim 2 in which said sealing member is sealed against the internal surface of said cylindrical wall portion.

4. A friction clutch as claimed in claim 2 in which said means defining passageways for supplying fluid to said fluid chambers includes means defining apertures in said sleeve, said apertures leading to said first fluid chamber.

5. A friction clutch as claimed in claim 2 in which said one drive member is a rotatably mounted hollow shaft, and the other of said drive members is a rotatably mounted outer casing.

References Cited in the file of this patent

UNITED STATES PATENTS

| | | |
|---|---|---|
| 2,393,835 | Stevenson | Jan. 29, 1946 |
| 2,437,430 | Lawrence | Mar. 9, 1948 |
| 2,529,423 | Shou | Nov. 7, 1950 |
| 2,775,331 | Peterson | Dec. 25, 1956 |
| 2,804,186 | Keir et al. | Aug. 27, 1957 |
| 2,868,341 | Snoy | Jan. 13, 1959 |
| 2,919,778 | Aschauer | Jan. 5, 1960 |
| 2,920,732 | Richards | Jan. 12, 1960 |
| 2,922,314 | Johnson et al. | Jan. 26, 1960 |

FOREIGN PATENTS

| | | |
|---|---|---|
| 144,355 | Sweden | Mar. 2, 1954 |